United States Patent

[11] 3,627,771

[72] Inventors Russell Kwok
Concord, Calif.;
Paul Pranc, Indianapolis, Ind.
[21] Appl. No. 818,091
[22] Filed Apr. 21, 1969
[45] Patented Dec. 14, 1971
[73] Assignee Eli Lilly and Company
Indianapolis, Ind.

[54] RING CLOSURE WITH CYANOGEN BROMIDE
2 Claims, No Drawings

[52] U.S. Cl.............................................. 260/293 E,
260/239 B, 260/326.62
[51] Int. Cl...................................................... C07d 29/32

[50] Field of Search............................................ 260/293 E,
239 B, 326.62

[56] References Cited
UNITED STATES PATENTS
3,413,309 11/1968 Makosza et al............... 260/333

Primary Examiner—Henry R. Jiles
Assistant Examiner—G. Thomas Todd
Attorneys—Everet F. Smith and James L. Rowe ABSTRACT: A novel synthesis of 4-phenylpiperidines and related nitrogen heterocycles, using cyanogen bromide as the condensing agent.

3,627,771

RING CLOSURE WITH CYANOGEN BROMIDE

BACKGROUND OF THE INVENTION

4-Phenylpiperidine analgesics came into prominence during World War II with the advent of meperidine (4-phenyl-4-carboxyethyl-1-methylpiperidine). Eisleb, *Ber.* 74 B., 1,433 (1941), first prepared meperidine by a synthetic procedure involving a double alkylation of phenylacetonitrile with bis(2-chloroethyl)-methylamine to give 1-methyl-4-cyano-4-methylpiperdine, which compound yields meperidine upon ethanolysis. This synthesis suffered from the disadvantage that bis(2-chloroethyl)methylamine is an extremely potent vesicant, which the allies had considered employing as a war gas in case chemical warfare erupted during World War II. The compound was given the name HN2.

It was obviously desirable to find a method of synthesizing meperidine which avoided the use of HN2. One such method was devised by Bergel and coworkers, *J. Chem. Soc.*, 1944, 265. This procedure used as starting material bis(2-chloroethyl)-phenylacetonitrile synthesized by a three-step procedure. This latter compound reacted with methylamine to yield the 1-methyl-4-cyano-4-phenylpiperidine, the intermediate of Eisleb, which was then transformed to meperidine by standard procedures. Blicke et al., *J. Am. Chem. Soc.* 74, 1844 (1952), devised a still different preparatory procedure in which N,N-dimethyl(2-chloroethyl)amine was reacted with phenylacetonitrile to yield a bis(2-dimethylamino) derivative, which compound in turn yielded the Eisleb intermediate, 1-methyl-4-cyano-4-phenylpiperidine, upon heating at high temperature.

Many other 4-phenyl-4-carboxyethyl analgesics related to meperidine are known. These compounds differ from meperidine in that the group attached at the 1-position is a higher alkyl group, usually a phenyl-substituted alkyl group, instead of the methyl group of meperidine. These compounds can be prepared by appropriate modification of the above syntheses or by alkylation of N-desmethyl meperidine (normeperidine).

It is an object of this invention to provide a method for preparing a class of intermediates useful in the synthesis of meperidine and related compounds which avoids the disadvantages of prior art methods such as the use of HN2 as an intermediate, or the use of high temperatures in a condensation step.

SUMMARY OF THE INVENTION

In fulfillment of the above and other objectives, this invention provides a method of synthesizing 4-phenyl-4-cyanopiperidines, 3-phenyl-3-cyanopyrrolidines, 4-phenyl-4-cyanoazepines and 5-phenyl-5-cyanoazocines comprising the condensation of an α,α-bis(2-di-substituted aminoalkyl)phenylacetonitrile by means of cyanogen bromide to yield, in almost quantitative amounts, a 1,1-di-substituted-4-phenylpiperidinium bromide, a 1,1-di-substituted-3-phenylpyrrolidinium bromide, a 1,1-di-substituted-4-phenylazepinium bromide or a 1,1-di-substituted-5-phenylazocinium bromide. This synthesis is illustrated by the following reaction scheme:

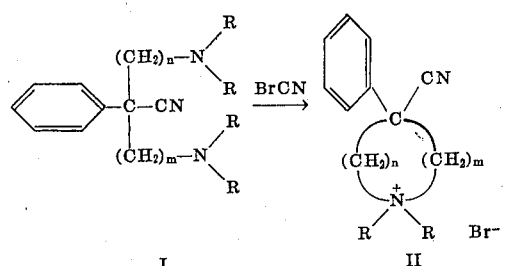

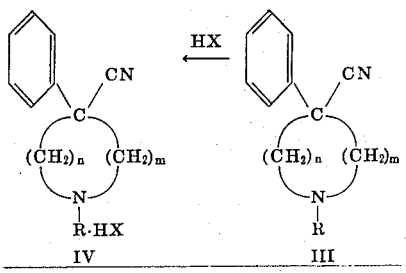

wherein R is $C_1$-$C_3$ alkyl or phenyl-substituted $C_1$-$C_3$ alkyl, wherein said phenyl group can be further substituted by methoxy, methyl or halogen such as chlorine, bromine and fluorine;

wherein X is the anion of a mineral acid such as chloride, bromide, iodide, sulfate, bisulfate, phosphate, dihydrogen phosphate, nitrate and the like, anions, and wherein $n$ is 1 to 3, and $m$ is 2 to 3.

In carrying out the above reaction, the bis-di-substituted aminoalkyl-phenylacetonitrile (I) is dissolved in an inert solvent such as chloroform. A solution of cyanogen bromide in the same solvent is added in dropwise fashion. The desired reaction occurs spontaneously, and the product, the pyrrolidinium, piperidinium, azepinium or azocinium bromide (II), separates as a white solid and is isolated by filtration or other convenient means. The isolated quaternary bromide is then converted to the corresponding tertiary heterocycle by heating in vacuo, the desired product distilling out of the reaction mixture as a heavy oil. The product is converted by conventional means to the hydrochloride or other suitable salt. Intermediates which can be prepared by the above reaction include:

1-phenethyl-4-phenyl-4-cyanopiperidine sulfate, 1-benzyl-4-phenyl-4-cyanoazepine nitrate, 1-n-propyl-5-phenyl-5-cyanoazocine dihydrogenphosphate, 1-p-chlorophenylethyl-4-phenyl-4-cyanopiperidine hydrobromide, 1-(3′-o-fluorophenyl)-propyl-4-phenyl-4-cyanopiperidine bisulfate, 1-(m-bromobenzyl)-4-phenyl-4-cyanoazepine hydrochloride, 1(2′-p-tolyl)ethyl-5-phenyl-5-cyanoazocine hydrochloride, 1-(2′-o-anisyl)ethyl-3-phenyl-3-cyanopiperidine bisulfate, 1p-tolymethyl-3-phenyl-3-cyanopyrrolidine hydriodide.

Conversion of the N-substituted heterocyclic compounds to produce derivatives having analgesic or other pharmacological activities is accomplished by hydrolyzing the cyano group, preferably using alcoholic base, to yield directly the desired carboxylic ester, as outlined by Eisleb supra. In general, if the cyanide group is hydrolyzed to a carbalkoxy group, if the substituent on the ring nitrogen is lower alkyl or phenyl-substituted lower alkyl, and if the nitrogen heterocycle is piperidine, the resulting compounds are analgesics. The cyanide group in such a compound can also be rearranged to yield a 4-phenyl-4-hydroxy-N-alkylpiperidine, esters of which with lower aliphatic acids are also powerful analgesics (the so-called meperidine reverse esters). In the above synthesis, if R is benzyl and the nitrogen heterocycle is piperidine, the benzene group can be removed by catalytic hydrogenation to yield eventually normeperidine, a well-known intermediate in the preparation of analgesics. Where the nitrogen heterocycle is pyrrolidine, azepine or azocine, the intermediates of this invention are transformed by the above processes into compounds having not only analgesic but also sedative, anticonvulsant and antitussive properties.

This invention is further illustrated by the following specific examples.

EXAMPLE 1

A.

4-Cyano-1,1-dimethyl-4-phenylpiperidinium bromide

α,α-Bis(2-dimethylaminoethyl)phenylacetonitrile was prepared by alkylating phenylacetonitrile twice with dimethylamino-2-chloroethylamine in liquid ammonium using lithium amide as the condensing agent. α,α-Bis(2-dimethylaminoethyl) phenylacetonitrile thus prepared boiled at about 97° C. at 15 mm. Hg; $N^{25}{}_D = 1.5078$.

Thirty-six and one-half grams of the above compound were dissolved in 200 ml. of chloroform to which were added dropwise with stirring 14.75 g. cyanogen bromide dissolved in 250 ml. of chloroform. A white precipitate comprising α,α-bis(2-dimethylaminoethyl)phenylacetonitrile formed almost immediately. After the addition had been completed, the reaction mixture was stirred for an hour, and 1,1-dimethyl-4-cyano-4-phenylpiperidinium bromide formed in the reaction was separated by filtration, washed with chloroform and dried. The compound melted at about 317°–320° C. [K. Miescher and H. Kaegi, Chem. Abstr., 44, 7886f (1950) report M.P.=305°Φ¼⁻315° C.]

Analysis calc: C, 56.96; H, 6.48; N, 9.49; Br, 27.07. Found: C, 57.16; H, 6.65; N, 9.55; Br, 27.00.

B.

4-Cyano-1-methyl-4-phenylpiperidine

Fifteen grams of the above quaternary bromide were heated in vacuo in a vacuum distillation apparatus. 4-Cyano-1-methyl-4-phenylpiperidine distilled from the heated flask and was collected. The distillate was diluted with ether and filtered. Upon passing dry hydrogen chloride into the ethereal solution, 4-cyano-1-methyl-4-phenylpiperidine hydrochloride precipitated. The compound melted at 222°–224° C. after recrystallization from acetonitrile (Eisleb supra reports 221°–224° C.). Hydrolysis of this above compound by the method of Eisleb supra yields meperidine, a commercially available analgesic.

Following the above procedure, heterocyclic nitrogen compounds containing five, seven or eight membered rings are synthesized by utilizing starting materials having at least one methyl or propyl chain in place of the ethyl chain of the above example. In this way α-dimethylaminoetylphenylacetonitrile can be alkylated with dimethylchloromethylamine to yield α-dimethylaminoethyl- αdimethylaminomethylphenylactonitrile which compound on treatment with cyanogen bromide yields 1,1dimethyl-4-cyano-4-phenylpyrrolidinium bromide. Heating the latter compound yields directly 1-methyl-3-cyano-3-phenyl pyrrolidine.

Compounds possessing a group in the 1-position other than methyl are prepared by utilizing a starting diamine carrying groups on the amine nitrogen which will yield the desired derivative upon cyclization and heating. For example, if a 1-benzyl derivative of 5-cyano-5-phenyl-azocine is to be prepared, phenylacetonitrile is successively alkylated with dibenzyl-γ-chloropropylamine to yield α,α-bis(γ-dibenzylaminopropyl)phenylacetonitrile. This compound on treatment with cyanogen bromide yields 1,1-dibenzyl-5-cyano-5-phenylazocinium bromide, which, on heating, yields the desired 1-benzyl-5-cyano-5-phenylazocine.

It will be readily apparent to those skilled in the art that other compounds coming within the scope of formula III above can be prepared by judicious selection of starting materials corresponding to formula I above, which starting materials will, upon ring closure with cyanogen bromide followed by dealkylation by heating, yield the desired heterocyclic nitrogen derivative.

We claim:

1. A method for preparing substituted heterocyclic nitrogen compounds which comprises contacting a compound of the formula:

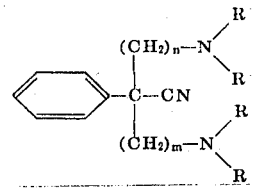

wherein R is $C_1$-$C_3$ alkyl or phenyl-substituted $C_1$-$C_3$ alkyl, wherein said phenyl group can be substituted with methoxy, methyl, chlorine, bromine of fluorine substituents;

$n$ is 1 to 3, and
$m$ is 2 to 3, in an inert solvent with cyanogen bromide to yield a compound of the formula:

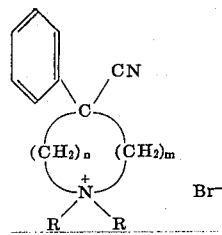

wherein R, $n$ and $m$ have the same meaning as hereinabove, and then heating said compound to yield a compound of the formula:

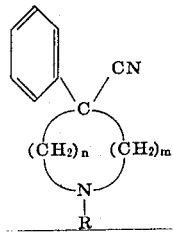

wherein R, $n$ and $m$ have the same meaning as hereinabove.

2. The process according to claim 1 wherein α,α-bis(2-dimethylaminoethyl)phenylacetonitrile is treated with cyanogen bromide to yield 1,1-dimethyl-4-cyano-4-phenyl piperidinium bromide, which latter compound is in turn heated to yield 1-methyl-4-cyano-4-phenyl piperidine.

* * * * *